March 10, 1936.    R. STRESAU    2,033,311

METHOD OF ELECTRIC ARC WELDING

Filed Feb. 11, 1929

INVENTOR.

RICHARD STRESAU

BY

ATTORNEY.

Patented Mar. 10, 1936

2,033,311

UNITED STATES PATENT OFFICE 2,033,311

METHOD OF ELECTRIC ARC WELDING

Richard Stresau, Wauwatosa, Wis., assignor to A. O. Smith Corporation, Milwaukee, Wis., a corporation of New York Application February 11, 1929, Serial No. 339,200

6 Claims. (Cl. 219—10)

This invention relates to a method of electric arc welding and more particularly to the welding of thick metal plates by electric arc welding with a metallic electrode.

Where an electric arc is employed to fuse metal into a welding groove provided between the edges to be welded, the progressive deposition of metal in the groove sets up certain stress conditions which have heretofore caused considerable difficulties in electric welding.

The object of the invention is to provide a method which will overcome such difficulties and will produce a weld which is sound and free from internal shrink cracks.

The accompanying drawing illustrates an application of the invention as follows.

Figure 1:
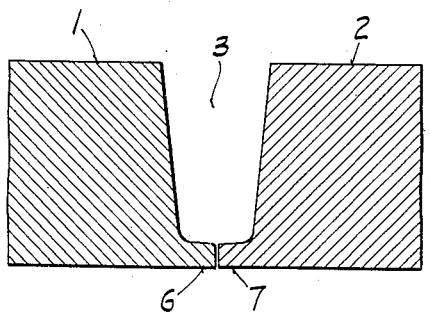
Fig. 1 is an end elevation illustrating the welding groove employed.

As shown in Figure 1 the plates 1 and 2, to be welded, are arranged side by side with their meeting edges chamfered to provide a welding groove 3.

Figure 3:
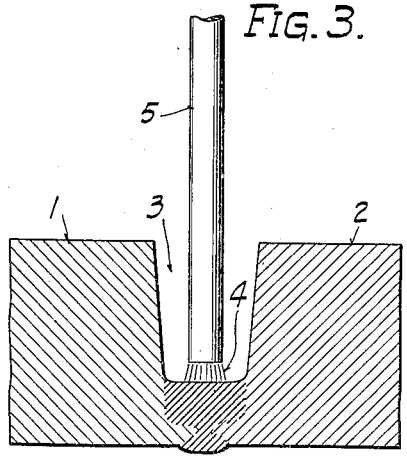
Fig. 3 is a similar view illustrating an application of the present invention.
Figure 4:
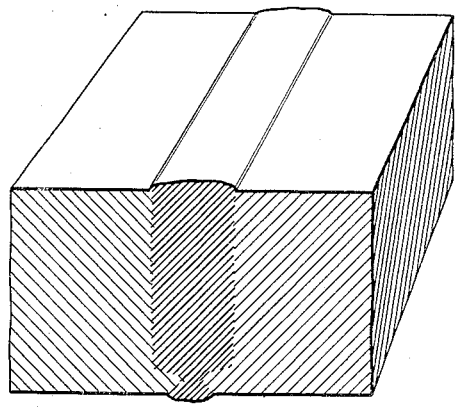
Fig. 4 is a perspective view of the finished welded structure adjacent the seam.

The plates are then welded together by means of a welding arc 4 established between the same and a fusible metallic electrode 5, as shown in Fig. 3.

The bottom of the groove 3 is formed by lips 6 and 7 which are integral with the metal plates to be welded. The lips are preferably separated a slight distance to enable a greater penetration and fusion of the same by the arc.

Figure 2:
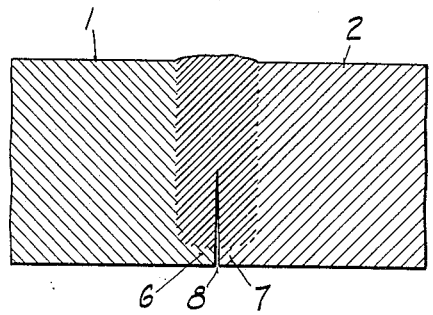
Fig. 2 is a similar view illustrating the difficulties encountered in welding thick metal plates.

However, where the penetration is insufficient to completely fuse the lips together, a slight crack 8 is left therebetween at the lower edge thereof and, as the fusing welding metal is deposited in the welding groove in successive layers, the bottom layers, which were first deposited, cool first. The cooling of said layers tends to contract the metal thereof and there is a tendency for the crack 8 between the lips to extend itself up through the lower layers of the weld, as shown in Fig. 2.

This type of crack is known as a shrinkage crack and is particularly dangerous since it does not affect the top layers of the weld and is therefore not ordinarily detectable by sight.

It has been proposed to overcome the difficulty by providing lips sufficiently thin to insure a proper penetration and fusion of the same together, but in the welding of excessively thick plates, it is difficult to properly machine and align the lips and this difficulty necessitates the employment of lips of substantial thickness in order that the bottom of the groove will be closed.

The present invention contemplates the overcoming of this difficulty by insuring that the lips 6 and 7 are completely fused together prior to the filling of the welding groove.

The arc 4 established between the work and the metallic fusible weldrod 5 is caused to traverse the seam and to deposit the first layer of fusing metal therein. At the same time, the arc penetrates and fuses the lips together. Then the arc is caused to traverse the underside of the lips and to penetrate and fuse the lower portion of the lips together and to thereby eliminate any crack which may have been left between the lips by the first welding operation. The groove may then be filled without material danger from shrinkage cracks.

The arc may be caused to fuse the under side of the lips prior to fusing the first layer of welding metal in the groove.

The invention may have various modifications within the scope of the claims.

I claim:

1. The method of electric arc welding thick metal plates which comprises providing integral lips on the edges to be welded, bringing said edges into welding position with said lips cooperating to form the bottom of a welding groove between the edges, fusing said lips together and depositing a layer of welding metal into said groove, then fusing the underside of the lips to eliminate any crack which may have been left therebetween, and then filling the welding groove with fusing welding metal to complete the weld.

2. The method of electric arc welding thick metal plates which comprises providing integral lips on the edges to be welded, bringing said edges into welding position with said lips forming the bottom of a welding groove between said edges, fusing said lips together on both sides thereof to eliminate any crack therebetween which might tend to cause a shrinkage crack in the weld, and then filling said welding groove with welding metal to complete the weld.

3. The method of electric arc welding heavy metal parts which includes grooving the parts at the joint to produce abutting edge portions of such thickness that a light weld will not fully penetrate the same, uniting said parts along said edge portions on the side of the parts opposite the groove by a light backing-up weld and then uniting the parts on their opposite side along the length of the groove by a weld formed by fusing the walls of the groove and filling the groove with molten metal.

4. The method of uniting metallic parts by means of the electric arc which includes the steps of shaping the edges of the parts to be welded to form in one side of the parts a portion of a groove the bottom of which is spaced from the other side of the parts a sufficient distance to form a thickened edge, placing the thickened edge of the parts together to form a welding groove, uniting the parts first on the ungrooved side by a continuous weld that does not fully penetrate the thickened edges and then welding the parts on the other side by fusing the walls of the groove and filling the groove with molten metal to complete the joint between the parts.

5. The method of uniting metallic parts by means of the electric arc which includes the steps of shaping the edges of the parts to be welded to form in one side of the parts a portion of a groove the bottom of which is spaced from the other side of the parts a greater distance than can be fully penetrated by a light weld, placing the parts together to form a welding groove, uniting the parts on the ungrooved side by a light continuous weld and then completing the welding operation by fusing the walls of the groove and filling the groove with molten metal.

6. The method of uniting metallic parts by means of an electric arc which includes the steps of cutting away the edges of the parts to be welded to form parallel or substantially parallel walls with thickened edges extending from the lower sides, assembling the parts with their thickened edges abutting each other to form a narrow welding groove, starting the welding operation by depositing on the ungrooved sides of the parts a bead of weld metal which does not fully penetrate said thickened edges, continuing the welding operation by fusing the side walls of the groove and filling the groove with molten metal to produce a weld that intersects said first weld at the bottom of the groove and completing the weld by depositing a single bead of metal fused with the edges of said groove and with the metal deposited in said groove.

RICHARD STRESAU.